(12) United States Patent
Tazaki

(10) Patent No.: US 6,306,803 B1
(45) Date of Patent: Oct. 23, 2001

(54) REFRIGERATOR OIL FOR CARBON DIOXIDE REFRIGERANT, AND METHOD OF USING IT FOR LUBRICATION

(75) Inventor: Toshinori Tazaki, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/432,217

(22) Filed: Nov. 3, 1999

(30) Foreign Application Priority Data

Jun. 21, 1999 (JP) .................................................. 11-174629
Jun. 28, 1999 (JP) .................................................. 11-181190

(51) Int. Cl.⁷ ................................................ C10M 141/02
(52) U.S. Cl. ........................... 508/539; 508/579; 252/68
(58) Field of Search .............................. 252/68; 508/539, 508/579

(56) References Cited

U.S. PATENT DOCUMENTS

| | | | |
|---|---|---|---|
| 4,948,525 | * 8/1990 | Sasaki et al. ........................... | 252/68 |
| 5,269,955 | * 12/1993 | Kawaguchi et al. .................... | 252/68 |
| 5,310,492 | * 5/1994 | Seiki et al. .............................. | 252/68 |
| 5,326,486 | * 7/1994 | Mizui et al. ............................ | 252/68 |
| 5,370,809 | * 12/1994 | Ishida et al. ........................... | 252/68 |
| 5,403,503 | * 4/1995 | Seiki et al. .............................. | 252/68 |
| 5,449,472 | * 9/1995 | Egawa et al. ........................... | 252/68 |
| 6,013,609 | * 1/2000 | Katafuchi .............................. | 508/206 |

FOREIGN PATENT DOCUMENTS

| | | |
|---|---|---|
| 197 19 132 A1 | 5/1997 | (DE) . |
| 198 42 019 A1 | 4/1999 | (DE) . |
| 0 739 973 A1 | 10/1996 | (EP) . |
| 0 992 572 A2 | 4/2000 | (EP) . |
| 1 008 643 A2 | 6/2000 | (EP) . |
| WO 98/50499 | 4/1998 | (WO) . |
| WO 9850499 | * 11/1998 | (WO) . |
| WO 9913032 | * 3/1999 | (WO) . |

OTHER PUBLICATIONS

Patent Abstracts of Japan, 10046169, Feb. 17, 1998.

* cited by examiner

Primary Examiner—Jacqueline V. Howard
(74) Attorney, Agent, or Firm—Oblon, Spivak, McClelland, Maier & Neustadt, P.C.

(57) ABSTRACT

Provided is a refrigerator oil, especially that for carbon dioxide refrigerant, which comprises a base oil comprising an oxygen-containing organic compound as the essential component and having a kinematic viscosity at 100° C. of from 5 to 50 mm²/sec and a viscosity index of at least 60, and optionally contains additives of, for example, extreme pressure agent and acid scavenger. The refrigerator oil can be used in compression refrigerators with carbon dioxide refrigerant therein, concretely in refrigerating or heating-cooling equipment such as car air conditioners, refrigerators, freezers, air conditioners, heat pumps, compression refrigeration cycles equipped with oil separator and/or hot gas line, etc. This is stable and has excellent lubricity (abrasion resistance) even in a supercritical carbon dioxide atmosphere, and therefore can be used for a long period of time in the atmosphere.

19 Claims, 1 Drawing Sheet

REFRIGERATOR OIL FOR CARBON DIOXIDE REFRIGERANT, AND METHOD OF USING IT FOR LUBRICATION

BACKGROUND OF THE INVENTION

1. Field of the Invention

The present invention relates to a refrigerator oil for carbon dioxide ($CO_2$) refrigerant, and to a method of using it for lubrication. The refrigerator oil can be used in compression refrigerators with carbon dioxide refrigerant therein, especially in refrigerating or heating-cooling equipment such as car air conditioners, refrigerators, freezers, air conditioners, heat pumps, compression refrigeration cycles equipped with oil separator and/or hot gas line, etc.

2. Description of the Related Art

In general, a compression refrigeration cycle for refrigerators, for example, that for compression refrigerators comprising a compressor, a condenser, an expansion valve and an evaporator is of a closed system in which is circulated a mixed liquid comprising a refrigerant and a lubricating oil. In compression refrigerators of that type, in general, chlorofluorocarbons such as dichlorodifluoromethane (R-12) and chlorodifluoromethane (R-22) have heretofore been used as refrigerants. Various types of lubricating oils have been produced and used together with such refrigerants. However, when released in air, these Flon compounds that have heretofore been used as refrigerants will bring about environmental pollution, as destroying the ozone layer existing in the stratosphere. Therefore, their use is being severely controlled in all the world. Given the situation, new refrigerants, hydrofluorocarbons and fluorocarbons such as typically 1,1,1,2-tetrafluoroethane (R-134) have become specifically noted. Hydrofluorocarbons and fluorocarbons will not destroy the ozone layer. However, as their life in air is long, they will cause global warming. Therefore, the recent tendency in the art is toward using refrigerants from natural resources that are free from the problem.

Above all, carbon dioxide is excellent as it is harmless to the environment and is safe to human beings. In addition, it has the advantages of anywhere easy availability and extremely low costs with no necessity for recovery. For these reasons, carbon dioxide has been much used as the refrigerant for refrigerators.

Unexpectedly, however, using such carbon dioxide as a refrigerant is often problematic in that the system with carbon dioxide therein requires higher jetting pressure and has higher temperature, as compared with that where is used R-134a or the like, with the result that the refrigerator oil in the system is exposed to carbon dioxide of being in a supercritical condition. Therefore, when such a carbon dioxide refrigerant is combined with ordinary refrigerator lubricating oil, the lubricating oil could not exhibit good lubricity and its ability to improve the abrasion resistance of machine parts is often poor. In addition, the stability of the lubricating oil is worsened, and stably using it for a long period of time is impossible.

SUMMARY OF THE INVENTION

The present invention has been made in consideration of the viewpoints noted above, and its object is to provide a refrigerator oil, which exhibits good lubricity and can be stably used for a long period of time even in a refrigeration cycle where is used a refrigerant that comprises, as the essential component, carbon dioxide of being in a supercritical condition at high temperature and under high pressure. The invention is also to provide a refrigerator oil capable of exhibiting good lubricity and good sealability and capable of being stably used for a long period of time even in a compression refrigeration cycle where is used a refrigerant comprising carbon dioxide as the essential component, and further to provide a method of using the refrigerator oil for lubrication.

We, the present inventors have assiduously studied and, as a result, have found that the object of the invention can be effectively attained by using a lubricating oil comprising a specific base oil and an additive thereto. Unexpectedly, in addition, we have further found that, when a mixture of a polyoxyalkylene glycol and a polyvinyl ether is used as the base oil for refrigerator oil, then the compatibility of the polyoxyalkylene glycol with carbon dioxide refrigerant is enhanced, and that, when a specific additive is added to the refrigerator oil comprising the base oil of that type, then the refrigerator oil is well stable and can exhibit good lubricity even in a carbon dioxide atmosphere of being in a supercritical condition while it maintains good compatibility with carbon dioxide refrigerant. On the basis of these findings, the inventors have completed the present invention.

Specifically, the invention provides the following:

1. A refrigerator oil for carbon dioxide refrigerant, which comprises a base oil comprising an oxygen-containing organic compound as the essential component and having a kinematic viscosity at 100° C. of from 5 to 50 $mm^2/sec$ and a viscosity index of at least 60.
2. The refrigerator oil of above 1, which further contains a metal salt of a carboxylic acid.
3. The refrigerator oil of above 2, wherein the metal salt of a carboxylic acid is an alkali metal salt of a carboxylic acid having from 3 to 60 carbon atoms.
4. The refrigerator oil of above 1, wherein the oxygen-containing organic compound is at least one selected from polyoxyalkylene glycols, polyvinyl ethers, polyesters and carbonates.
5. The refrigerator oil of above 1, wherein the oxygen-containing organic compound is a compound of a general formula (I) or a compound comprising structural units of a general formula (V):

$$R^1-[(OR^2)_m-OR^3]_n \qquad (I)$$

where $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents an integer of from 1 to 6; and m represents a number to give a mean value of m×x falling between 6 and 80;

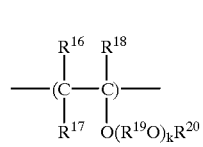

where $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number of from 0 to 10 on average; $R^{16}$ to $R^{20}$ may be the same or different in different structural units; and plural $R^{19}O$'s, if any, may be the same or different.

6. The refrigerator oil of above 1, wherein the oxygen-containing organic compound is ① a polyalcohol ester, or ② a polycarboxylate.

7. The refrigerator oil of above 1, which further contains a phosphorus-containing extreme pressure agent.

8. The refrigerator oil of above 1, which further contains an acid scavenger.

9. The refrigerator oil of above 1, wherein the oxygen-containing organic compound which further contains a phenolic antioxidant.

10. The refrigerator oil of above 1, wherein the base oil is a mixture of a polyoxyalkylene glycol and a polyvinyl ether.

11. The refrigerator oil of above 10, wherein the ratio of the polyoxyalkylene glycol to the polyvinyl ether falls between 40/60 and 99.9/0.1 by weight.

12. The refrigerator oil of above 11, wherein the polyoxyalkylene glycol is a compound of a general formula (I):

where $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents an integer of from 1 to 6; and m represents a number to give a mean value of m×x falling between 6 and 80.

13. The refrigerator oil of above 11, wherein the polyvinyl ether is a compound comprising structural units of a general formula (V):

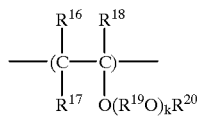

where $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number of from 0 to 10 on average; $R^{16}$ to $R^{20}$ may be the same or different in different structural units; and plural $R^{19}O$'s, if any, may be the same or different.

14. The refrigerator oil of above 11, which further contains an acid scavenger.

15. The refrigerator oil of above 11, which further contains an extreme pressure agent.

16. The refrigerator oil of above 15, wherein the extreme pressure agent is at least one selected from metal salts of carboxylic acids and phosphorus-containing extreme pressure agents.

17. A method of using the refrigerator oil of above 1 in a compression refrigeration cycle equipped with at least one selected from oil separators and hot gas lines.

18. A method of lubricating a compression refrigeration cycle equipped with at least one selected from oil separators and hot gas lines, for which is used the refrigerator oil of above 1.

Figure 1:
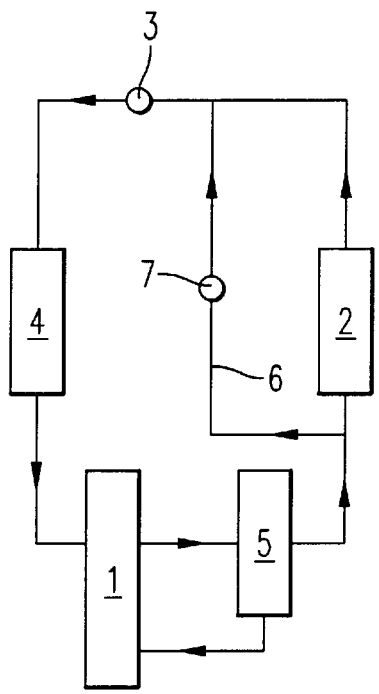
FIG. 1 is a flowchart showing one embodiment of a compression refrigeration cycle of "compressor-condenser-expansion valve-evaporator", which is equipped with an oil separator and a hot gas line.

In those, 1 indicates a compressor; 2 indicates a condenser; 3 indicates an expansion valve; 4 indicates an evaporator; 5 indicates an oil separator; 6 indicates a hot gas line; and 7 indicates a hot gas line valve.

DETAILED DESCRIPTION OF THE INVENTION

The base oil for use in the invention comprises, as the essential component, an oxygen-containing organic compound and has a kinematic viscosity at 100° C. of from 5 to 50 mm$^2$/sec and a viscosity index of at least 60. Base oil having a kinematic viscosity of smaller than 5 mm$^2$/sec or larger than 50 mm$^2$/sec is unfavorable, since the former could not exhibit good lubricity in high-temperature, high-pressure carbon dioxide conditions and the latter causes great power loss. Base oil having a viscosity index of smaller than 60 is also unfavorable, since its kinematic viscosity is substantially lowered at high temperatures and its lubricity and sealing resistance will be poor.

The oxygen-containing organic compound for use in the invention is preferably a compound having at least 2 oxygen atoms in the molecule. Concretely, it includes polyoxyalkylene glycols, polyvinyl ethers, polyesters and carbonates, and mixtures of two or more of them are also employable herein. These compounds have good compatibility with carbon dioxide refrigerant to exhibit good lubricity. They are described in detail hereinunder.

(A-1) Polyoxyalkylene Glycols

Polyoxyalkylene glycols usable herein are, fore example, compounds of a general formula (I):

wherein $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents an integer of from 1 to 6; and m represents a number to give a mean value of m×x falling between 6 and 80.

In formula (I), the alkyl group for $R^1$ and $R^3$ maybe linear, branched or cyclic. Specific examples of the alkyl group include a methyl group, an ethyl group, an n-propyl group, an isopropyl group, all types of butyl group, all types of pentyl group, all types of hexyl group, all types of heptyl group, all types of octyl group, all types of nonyl group, all types of decyl group, a cyclopentyl group, a cyclohexyl group, etc. If the number of carbon atoms constituting the alkyl group is larger than 10, the compatibility of the base oil with refrigerant will be poor and the base oil will be troubled by phase separation therein. Preferably, the alkyl group has from 1 to 6 carbon atoms.

The alkyl moiety in the acyl group for $R^1$ and $R^3$ may be linear, branched or cyclic. As specific examples of the alkyl moiety in the acyl group, referred to are those with from 1 to 9 carbon atoms mentioned above for the alkyl group. If the number of carbon atoms constituting the acyl group is larger than 10, the compatibility of the base oil with refrigerant will be poor and the base oil will be troubled by phase separation therein. Preferably, the acyl group has from 2 to 6 carbon atoms.

Where $R^1$ and $R^3$ are both alkyl groups or acyl groups, they may be the same or different.

Where n in formula (I) is 2 or more, plural $R^3$'s in one molecule may be the same or different.

Where $R^1$ is an aliphatic hydrocarbon group having from 2 to 6 bonding sites and having from 1 to 10 carbon atoms, the aliphatic hydrocarbon group may be linear or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group, a cyclohexylene group, etc. Examples of the aliphatic hydrocarbon group having from 3 to 6 bonding sites include residues to be derived from polyalcohols such as trimethylolpropane, glycerin, pentaerythritol, sorbitol, 1,2,3-trihydroxycyclohexane and 1,3,5-trihydroxycyclohexane, by removing the hydroxyl groups from them.

If the number of carbon atoms constituting the aliphatic hydrocarbon group is larger than 10, the compatibility of the base oil with refrigerant will be poor and the base oil will be troubled by phase separation therein. Preferably, the aliphatic hydrocarbon group has from 2 to 6 carbon atoms.

Preferably, in the invention, at least one of $R^1$ and $R^3$ is an alkyl group, more preferably having from 1 to 3 carbon atoms. Especially preferred is a methyl group, in view of the viscosity characteristic of the base oil. For the same reason, both $R^1$ and $R^3$ are even more preferably alkyl groups, especially methyl groups.

$R^2$ in formula (I) is an alkylene group having from 2 to 4 carbon atoms. The oxyalkylene group for the repetitive units in formula (I) includes an oxyethylene group, an oxypropylene group, and an oxybutylene group. The oxyalkylene groups in one molecule may be all the same or different ones. One molecule of the compound may have two or more different types of oxyalkylene groups. Especially preferred herein are copolymers having both oxyethylene (EO) and oxypropylene (PO) groups. In those copolymers, it is desirable that the ratio of EO/(PO+EO) falls between 0.1 and 0.8 in view of the burning load to the refrigerator oil and of the viscosity characteristic of the oil. It is further desirable that the ratio of EO/(PO+EO) falls between 0.3 and 0.6 in view of the moisture absorption of the oil.

In formula (I), n is an integer of from 1 to 6, and shall be defined depending on the number of the bonding sites in $R^1$. For example, where $R^1$ is an alkyl group or an acyl group, n is 1; and where it is an aliphatic hydrocarbon group having 2, 3, 4, 5 or 6 bonding sites, n is 2, 3, 4, 5 or 6, respectively.

m is a number to give a mean value of m×n falling between 6 and 80. If the mean value of m×n oversteps the defined range, the object of the invention could not be attained satisfactorily.

Polyoxyalkylene glycols of formula (I) include those having a hydroxyl group at the terminal. Such hydroxyl-terminated compounds could be favorably used in the invention so far as the terminal hydroxyl content of the compounds is not larger than 50 mol % of the total terminal content thereof. If, however, the terminal hydroxyl content thereof is larger than 50 mol %, the moisture absorption of the compounds will increase and the viscosity index thereof will decrease. The compounds having such a large terminal hydroxyl content are unfavorable to the invention.

As the polyoxyalkylene glycols for use in the invention, preferred are polyoxypropylene glycol dimethyl ethers of a general formula:

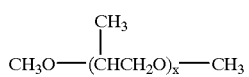

wherein x represents a number of from 6 to 80; and polyoxyethylene-polyoxypropylene glycol dimethyl ethers of a general formula:

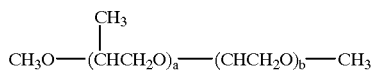

wherein a and b each are at least 1, and their total falls between 6 and 80, in view of the economical aspect of the compounds and of the effect thereof.

Also preferred are polyoxypropylene glycol monobutyl ethers of a general formula:

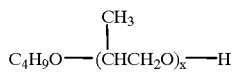

wherein x represents a number of from 6 to 80, as well as polyoxypropylene glycol diacetates, in view of the economical aspect of the compounds.

Polyoxyalkylene glycols of formula (I) are described in detail in Japanese Patent Laid-Open No. 305893/1990, any of which are employable herein.

Apart from the polyoxyalkylene glycols noted above, further employable herein are polyoxyalkylene glycol derivatives having at least one structural unit of a general formula (II):

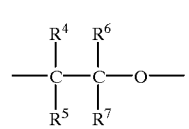

(II)

wherein $R^4$ to $R^7$ each represent a hydrogen atom, a monovalent hydrocarbon group having from 1 to 10 carbon atoms, or a group of a general formula (III):

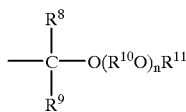

where $R^8$ and $R^9$ each represent a hydrogen atom, a monovalent hydrocarbon group having from 1 to 10 carbon atoms, or an alkoxyalkyl group having from 2 to 20 carbon atoms; $R^{10}$ represents an alkylene group having from 2 to 5 carbon atoms, a substituted alkylene group having an alkyl group as the substituent and having from 2 to 5 carbon atoms in total, or a substituted alkylene group having an alkoxyalkyl group as the substituent and having from 4 to 10 carbon atoms in total; n represents an integer of from 0 to 20; and $R^{11}$ represents a monovalent hydrocarbon group having from 1 to 10 carbon atoms, and at least one of $R^4$ to $R^7$ is the group of formula (III).

In formula (II), $R^4$ to $R^7$ each represent a hydrogen atom, a monovalent hydrocarbon group having from 1 to 10 carbon atoms, or a group of formula (III). The monovalent hydrocarbon group having from 1 to 10 carbon atoms is preferably a monovalent hydrocarbon group having at most 6 carbon atoms, most preferably an alkyl group having at most 3 carbon atoms.

In formula (III), $R^8$ and $R^9$ each represent a hydrogen atom, a monovalent hydrocarbon group having from 1 to 10 carbon atoms, or an alkoxyalkyl group having from 2 to 20 carbon atoms. Preferably, they each are an alkyl group having at most 3 carbon atoms, or an alkoxyalkyl group having at most 6 carbon atoms.

$R^{10}$ represents an alkylene group having from 2 to 5 carbon atoms, a substituted alkylene group having an alkyl group as the substituent and having from 2 to 5 carbon atoms in total, or a substituted alkylene group having an alkoxyalkyl group as the substituent and having from 4 to 10 carbon atoms in total. Preferably, it is an ethylene or substituted ethylene group having at most 6 carbon atoms.

$R^{11}$ represents a monovalent hydrocarbon group having from 1 to 10 carbon atoms. Preferably, it is a hydrocarbon group having at most 6 carbon atoms, more preferably at most 3 carbon atoms.

In formula (II), at least one of $R^4$ to $R^7$ is a group of formula (III). Preferably, either one of $R^4$ and $R^6$ is a group of formula (III), and the remaining one of $R^4$ and $R^6$ and also $R^5$ and $R^7$ each are a hydrogen atom or a monovalent hydrocarbon group having from 1 to 10 carbon atoms.

The polyoxyalkylene glycol derivatives have at least one structural unit of formula (II). More precisely, they include three types of polymers, which are homopolymers each composed of the structural units of formula (II) of one and the same type, copolymers each composed of at least two different types of the structural units of formula (II), and copolymers each comprising the structural units of formula (II) and any other structural units of, for example, a general formula (IV):

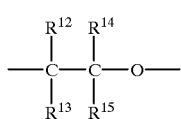

wherein $R^{12}$ to $R^{15}$ each represent a hydrogen atom or an alkyl group having from 1 to 3 carbon atoms.

Preferred examples of the homopolymers have from 1 to 200 structural units A of formula (II) and are terminated with any of a hydroxyl group, an acyloxy group having from 1 to 10 carbon atoms, an alkoxy group having from 1 to 10 carbon atoms, or an aryloxy group.

Preferred examples of the copolymers have two different types of structural units A and B each amounting to from 1 to 200 units or have from 1 to 200 structural units A of formula (II) and from 1 to 200 structural units C of formula (III), and are terminated with any of a hydroxyl group, an acyloxy group having from 1 to 10 carbon atoms, an alkoxy group having from 1 to 10 carbon atoms, or an aryloxy group. Various types of these copolymers are employable herein, including, for example, alternate copolymers, random copolymers or block copolymers comprising structural units A, structural units B (and/or structural units C), as well as graft copolymers with a main chain of structural units A as grafted with structural units B.

(A-2) Polyvinyl Ethers

Polyvinyl ethers for the base oil for use herein may be polyvinyl ether compounds comprising, for example, structural units of a general formula (V):

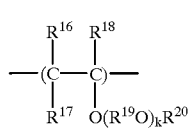

wherein $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number of from 0 to 10 on average; $R^{16}$ to $R^{20}$ may be the same or different in different structural units; and plural $R^{19}$O's, if any, may be the same or different.

Also usable herein are polyvinyl ether compounds of block or random copolymers comprising structural units of formula (V) noted above and structural units of the following general formula (VI):

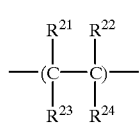

wherein $R^{21}$ to $R^{24}$ each represent a hydrogen atom or a hydrocarbon group having from 1 to 20 carbon atoms, and they may be the same or different; and $R^{21}$ to $R^{24}$ may be the same or different in different structural units.

In formula (V), $R^{16}$, $R^{17}$ and $R^{18}$ each represent a hydrogen atom, or a hydrocarbon group having from 1 to 8 carbon atoms, preferably from 1 to 4 carbon atoms, and they may be the same or different. Concretely, the hydrocarbon group includes an alkyl group including, for example, a methyl group, an ethyl group, an n-propyl group, an isopropyl group, an n-butyl group, an isobutyl group, a sec-butyl group, a tert-butyl group, all types of pentyl groups, all types of hexyl groups, all types of heptyl groups, and all types of octyl groups; a cycloalkyl group including, for example, a cyclopentyl group, a cyclohexyl group, all types of methylcyclohexyl groups, all types of ethylcyclohexyl groups, and all types of dimethylcyclohexyl groups; an aryl group including, for example, a phenyl group, all types of methylphenyl groups, all types of ethylphenyl groups, and all types of dimethylphenyl groups; and an arylalkyl group including, for example, a benzyl group, all types of phenylethyl groups, and all types of methylbenzyl groups. Especially preferably, $R^{16}$, $R^{17}$ and $R^{18}$ are all hydrogen atoms.

In formula (V), $R^{19}$ represents a divalent hydrocarbon group having from 1 to 10 carbon atoms, preferably from 2 to 10 carbon atoms. Concretely, the divalent hydrocarbon group having from 1 to 10 carbon atoms includes a divalent aliphatic group including, for example, a methylene group, an ethylene group, a phenylethylene group, a 1,2-propylene group, a 2-phenyl-1,2-propylene group, a 1,3-propylene group, all types of butylene groups, all types of pentylene groups, all types of hexylene groups, all types of heptylene groups, all types of octylene groups, all types of nonylene groups, and all types of decylene groups; an alicyclic group with two bonding sites to be derived from an alicyclic hydrocarbon which includes, for example, cyclohexane, methylcyclohexane, ethylcyclohexane, dimethylcyclohexane, and propylcyclohexane; a divalent aromatic hydrocarbon group including, for example, all types of phenylene groups, all types of methylphenylene groups, all types of ethylphenylene groups, all types of dimethylphenylene groups, and all types of naphthylene groups; an alkylaromatic group to be derived from an alkylaromatic hydrocarbon such as toluene, xylene or ethylbenzene, and having a monovalent bonding site both in the alkyl moiety and in the aromatic moiety; and a divalent alkylaromatic group to be derived from a polyalkylaromatic hydrocarbon such as xylene or diethylbenzene, and having bonding sites in the alkyl moieties. Of those, especially preferred are aliphatic groups having from 2 to 4 carbon atoms.

In formula (V), k indicates the number of the repetitive $R^{19}O$'s, falling between 0 and 10, preferably between 0 and 5 on average. Plural $R^{19}O$'s, if any, maybe the same or different.

In formula (V), $R^{20}$ represents a hydrocarbon group having from 1 to 20 carbon atoms, preferably from 1 to 10 carbon atoms. Concretely, the hydrocarbon group includes an alkyl group including, for example, a methyl group, an ethyl group, an n-propyl group, an isopropyl group, an n-butyl group, an isobutyl group, a sec-butyl group, a tert-butyl group, all types of pentyl groups, all types of hexyl groups, all types of heptyl groups, all types of octyl groups, all types of nonyl groups, and all types of decyl groups; a cycloalkyl group including, for example, a cyclopentyl group, a cyclohexyl group, all types of methylcyclohexyl groups, all types of ethylcyclohexyl groups, all types of propylcyclohexyl groups, and all types of dimethylcyclohexyl groups; an aryl group including, for example, a phenyl group, all types of methylphenyl groups, all types of ethylphenyl groups, all types of dimethylphenyl groups, all types of propylphenyl groups, all types or trimethylphenyl groups, all types of butylphenyl groups, and all types of naphthyl groups; and an arylalkyl group including, for example, a benzyl group, all types of phenylethyl groups, all types of methylbenzyl groups, all types of phenylpropyl groups, and all types of phenylbutyl groups.

$R^{16}$ to $R^{20}$ may be the same or different in different structural units.

Of the polyvinyl ether compounds (1) of formula (V), preferred are those in which the ratio by mol of carbon/oxygen falls between 4.2 and 7.0. If the molar ratio is smaller than 4.2, the moisture absorption of the compounds will be high; but if larger than 7.0, the compatibility of the compounds with refrigerant will be poor.

In formula (VI), $R^{21}$ to $R^{24}$ each represent a hydrogen atom or a hydrocarbon group having from 1 to 20 carbon atoms, and they may be the same or different. For examples of the hydrocarbon group having from 1 to 20 carbon atoms, referred to are the same as those mentioned hereinabove for $R^{20}$ in formula (V). $R^{21}$ to $R^{24}$ may be the same or different in different structural units.

Of the polyvinyl ether compounds (2) of block or random copolymers comprising structural units of formula (V) and structural units of formula (VI), preferred are those in which the ratio by mol of carbon/oxygen falls between 4.2 and 7.0. If the molar ratio is smaller than 4.2, the moisture absorption of the compounds will be high; but if larger than 7.0, the compatibility of the compounds with refrigerant will be poor.

In the invention, further employable are mixtures of the polyvinyl ether compound (1) and the polyvinyl ether compound (2).

Those polyvinyl ether compounds (1) and (2) may be produced through polymerization of vinyl ether monomers corresponding thereto, or through copolymerization of hydrocarbon monomers having olefinic double bonds and corresponding thereto with vinyl ether monomers also corresponding thereto.

Also preferably, the polyvinyl ether compounds for use in the invention are specifically terminated in the manner mentioned below. As one preferred example of the terminal structure of the compounds, one end of the molecule is terminated with a group of a general formula (VII) or (VIII):

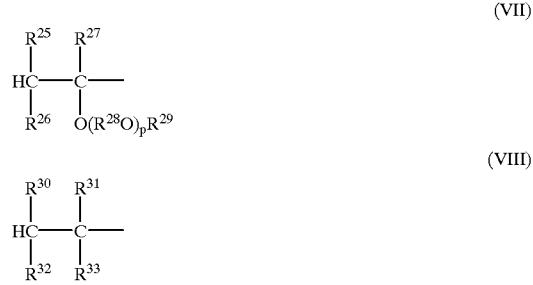

wherein $R^{25}$, $R^{26}$ and $R^{27}$ each represent a hydrogen atom or a hydrocarbon group having from 1 to 8 carbon atoms, and they may be the same or different; $R^{30}$, $R^{31}$, $R^{32}$ and $R^{33}$ each represent a hydrogen atom or a hydrocarbon group having from 1 to 20 carbon atoms, and they may be the same or different; $R^{28}$ represents a divalent hydrocarbon group having from 1 to 10 carbon atoms; $R^{29}$ represents a hydrocarbon group having from 1 to 20 carbon atoms; p represents a number of from 0 to 10 on average; and plural $R^{28}O$'s, if any, may be the same or different, and the other end thereof is terminated with a group of a general formula (IX) or (X)

-continued

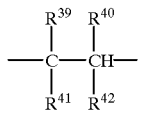
(X)

wherein $R^{34}$, $R^{35}$ and $R^{36}$ each represent a hydrogen atom or a hydrocarbon group having from 1 to 8 carbon atoms, and they may be the same or different; $R^{39}$, $R^{40}$, $R^{41}$ and $R^{42}$ each represent a hydrogen atom or a hydrocarbon group having from 1 to 20 carbon atoms, and they may be the same or different; $R^{37}$ represents a divalent hydrocarbon group having from 1 to 10 carbon atoms; $R^{38}$ represents a hydrocarbon group having from 1 to 20 carbon atoms; q represents a number of from 0 to 10 on average; and plural $R^{37}O$'s, if any, may be the same or different.

As another preferred example of the terminal structure of the compounds, one end of the molecule is terminated with a group of formula (VII) or (VIII) as above and the other end thereof is terminated with a group of a general formula (XI):

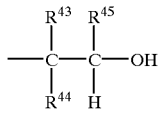
(XI)

wherein $R^{43}$, $R^{44}$ and $R^{45}$ each represent a hydrogen atom or a hydrocarbon group having from 1 to 8 carbon atoms, and they may be the same or different.

Of those polyvinyl ether compounds, especially preferred herein are the following:

(1) Compounds comprising structural units of formula (V) and terminated with a group of formula (VII) or (VIII) at one end and with a group of formula (IX) or (X) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, and $R^{20}$ is a hydrocarbon group having from 1 to 20 carbon atoms.

(2) Compounds composed of structural units of formula (V) only and terminated with a group of formula (VII) at one end and with a group of formula (IX) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, and $R^{20}$ is a hydrocarbon group having from 1 to 20 carbon atoms.

(3) Compounds comprising structural units of formula (V) and terminated with a group of formula (VII) or (VIII) at one end and with a group of formula (XI) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, and $R^{20}$ is a hydrocarbon group having from 1 to 20 carbon atoms.

(4) Compounds composed of structural units of formula (V) only and terminated with a group of formula (VII) at one end and with a group of formula (X) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, and $R^{20}$ is a hydrocarbon group having from 1 to 20 carbon atoms.

In the invention, also usable are polyvinyl ether compounds comprising structural units of formula (V) and terminated with a group of formula (VII) noted above at one end and with a group of the following general formula (XII) at the other end:

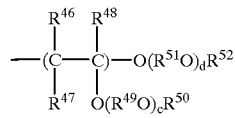
(XII)

wherein $R^{46}$, $R^{47}$ and $R^{48}$ each represent a hydrogen atom or a hydrocarbon group having from 1 to 8 carbon atoms, and they may be the same or different; $R^{49}$ and $R^{51}$ each represent a divalent hydrocarbon group having from 2 to 10 carbon atoms, and they may be the same or different; $R^{50}$ and $R^{52}$ each represent a hydrocarbon group having from 1 to 10 carbon atoms, and they may be the same or different; c and d each represent a number of from 0 to 10 on average, and they may be the same or different; and plural $R^{49}O$'s, if any, may be the same or different, and plural $R^{51}O$'s, if any, may also be the same or different.

Further usable herein are polyvinyl ether compounds of homopolymers or copolymers of alkyl vinyl ethers, which comprise structural units of a general formula (XIII) or (XIV)

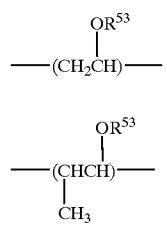
(XIII)

(XIV)

wherein $R^{53}$ represents a hydrocarbon group having from 1 to 8 carbon atoms, and have a weight-average molecular weight of from 300 to 5,000, and of which one end is terminated with a group of a general formula (XV) or (XVI):

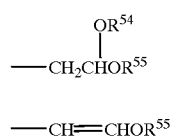
(XV)

(XVI)

wherein $R^{54}$ represents an alkyl group having from 1 to 3 carbon atoms; and $R^{55}$ represents a hydrocarbon group having from 1 to 8 carbon atoms.

Some polyvinyl ethers are described in detail in Japanese Patent Laid-Open Nos. 128578/1994, 125649/1993, 125650/1993, and 303736/1993, all of which are usable herein.

A mixture of polyoxyalkylene glycol and polyvinyl ether is usable as the base oil for the refrigerator oil for carbon dioxide refrigerant of the invention, in which the ratio of the two components may fall between 40/60 and 99.9/0.1 (by weight—the same shall apply hereunder), but preferably between 50/50 and 99/1, more preferably between 60/40 and 98/2. If the amount of the polyvinyl ether component is larger than 60%, the refrigerator oil comprising the two components could not have a desired viscosity index; but if smaller than 0.1%, the compatibility of the refrigerator oil with carbon dioxide component will be poor.

One preferred embodiment of the refrigerator oil for carbon dioxide refrigerant of the invention comprises, as the essential components, a mixture of a polyoxyalkylene glycol having a kinematic viscosity at 100° C. of from 5 to 50 mm²/sec, preferably from 5 to 40 mm²/sec, more preferably from 7 to 40 mm²/sec, even more preferably from 7 to 30 mm²/sec, and a polyvinyl ether having a kinematic viscosity at 100° C. of from 5 to 50 mm²/sec, preferably from 5 to 30 mm²/sec, more preferably from 7 to 20 mm²/sec.

In the mixture for the refrigerator oil, the lowermost limit of the kinematic viscosity of each component is so defined that the refrigerator oil comprising the mixture could have a suitable kinematic viscosity and could favorably exhibit its lubricity; while the uppermost limit thereof is so defined that the refrigerator oil will not cause power loss to interfere with the practicability of refrigerators that are driven with it.

Specifically, it is desirable that the refrigerator oil for carbon dioxide refrigerant of the invention, which comprises a mixture of a polyoxyalkylene glycol component and a polyvinyl ether component, has a kinematic viscosity of from 5 to 50 mm mm²/sec, more desirably from 5 to 40 mm²/sec, even more desirably from 7 to 30 mm²/sec. Also desirably, the it has a viscosity index of at least 60, more desirably at least 100, even more desirably at least 120, still more desirably at least 130. If the viscosity index of the refrigerator oil is smaller than 60, the substantial kinematic viscosity thereof will be lowered at high temperatures. If so, the refrigerator oil could not meet the requirement of good lubricity.

It is desirable that the critical solution temperature for carbon dioxide refrigerant of the refrigerator oil of the invention, which comprises, as the essential components, a mixture of a polyoxyalkylene glycol component and a polyvinyl alcohol component, is not lower than −60° C., more preferably not lower than −50° C. The refrigerator oil having a high critical dissolution temperature is favorable as it may keep good lubricity in refrigeration cycles.

The critical solution temperature for carbon dioxide refrigerant of the refrigerator oil may be measured by dissolving a 9/1 (by weight) mixture of carbon dioxide and the refrigerator oil at an ultra-low temperature followed by heating it at a predetermined constant heating rate whereupon the mixture is separated into two layers through phase separation in the heating process. The temperature at which the mixture being heated is separated into two layers through phase separation indicates the critical solution temperature of the refrigerator oil for the carbon dioxide refrigerant. Concretely, the method for measuring the temperature is described in the following section of Examples.

(A-3) Polyesters

Polyesters to be used as the base oil for use in the invention include ① polyalcohol esters, and ② polycarboxylates.

① Polyalcohol Esters

The polyalcohol esters may be esters of aliphatic polyalcohols with linear or branched fatty acids.

The aliphatic polyalcohols for the esters include, for example, ethylene glycol, propylene glycol, butylene glycol, neopentyl glycol, trimethylolethane, ditrimethylolethane, trimethylolpropane, ditrimethylolpropane, glycerin, pentaerythritol, dipentaerythritol, tripentaerythritol, and sorbitol.

The fatty acids may have from 3 to 12 carbon atoms. As preferred examples of the fatty acids, mentioned are propionic acid, butyric acid, pivalic acid, valeric acid, caproic acid, heptanoic acid, octanoic acid, nonanoic acid, decanoic acid, dodecanoic acid, isovaleric acid, neopentanoic acid, 2-methylvaleric acid, 2-ethylvaleric acid, 2-methylhexanoic acid, 2-ethylhexanoic acid, isooctanoic acid, isononanoic acid, isodecanoic acid, 2,2-dimethyloctanoic acid, 2-butyloctanoic acid, and 3,5,5-trimethylhexanoic acid. Semiesters of aliphatic polyalcohols with linear or branched fatty acids are also employable herein.

As the esters of aliphatic polyalcohols with linear or branched fatty acids, especially preferred are esters of pentaerythritol, dipentaerythritol or tripentaerythritol with fatty acids having from 5 to 12 carbon atoms, more preferably from 5 to 9 carbon atoms, such as valeric acid, hexanoic acid, heptanoic acid, 2-methylhexanoic acid, 2-ethylhexanoic acid, isooctanoic acid, isononanoic acid, isodecanoic acid, 2,2-dimethyloctanoic acid, 2-butyloctanoic acid, and 3,5,5-trimethylhexanoic acid.

Also usable herein are complex esters composed of semiesters of aliphatic polyalcohols with linear or branched C3–9 fatty acids, and aliphatic dibasic acids or aromatic dibasic acids. For such complex esters, preferred are C5–7 fatty acids, more preferably C5–6 fatty acids. The fatty acids of that type include valeric acid, hexanoic acid, isovaleric acid, 2-methylbutyric acid, 2-ethyl butyric acid, and their mixtures. Especially preferred are mixtures of a C5 fatty acid and a C6 fatty acid as mixed in a ratio by weight falling between 10/90 and 90/10. Along with those fatty acids, used are aliphatic dibasic acids for esterification with polyalcohols. The aliphatic dibasic acids include succinic acid, adipic acid, pimelic acid, suberic acid, azelaic acid, sebacic acid, undecane-diacid, dodecane-diacid, tridecane-diacid, and docosane-diacid. Also usable are aromatic dibasic acids, including phthalic acid and isophthalic acid. The esterification for preparing the complex esters comprises reacting a polyalcohol with a dibasic acid in a predetermined ratio to give a semiester followed by reacting the resulting semiester with a fatty acid, or the order of reacting a polyalcohol with a dibasic acid and a fatty acid may be reversed, or a dibasic acid and a fatty acid may be mixed and reacted both at a time with a polyalcohol for the intended esterification.

Also preferred for use herein are polyalcohol esters to be prepared by reacting an acid fluoride of a general formula (XVII):

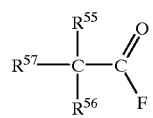

(XVII)

wherein $R^{56}$ to $R^{58}$ each represent an alkyl group having from 1 to 13 carbon atoms, provided that the alkyl group having 4 or more carbon atoms shall have at least one branch and that the total of the carbon atoms constituting $R^{56}$ to $R^{58}$ shall fall between 3 and 23, with a polyalcohol, as their moisture absorption to saturation is low (see Japanese Patent Laid-Open No. 157219/1997).

② Polycarboxylates

Dicarboxylates are usable herein, which may be dialkyl esters of aliphatic or aromatic dicarboxylic acids (having from 16 to 22 carbon atoms).

The aliphatic dicarboxylic acids include, for example, succinic acid, glutaric acid, adipic acid, pimelic acid, suberic acid, azelaic acid, sebacic acid, undecane-diacid, dodecane-diacid, tridecane-diacid, and docosane-diacid; and the aromatic dicarboxylic acids include, for example, phthalic acid, and isophthalic acid. The alcohol components for the esters may be of C5–8 alcohols, including, for example, amyl alcohol, hexyl alcohol, heptyl alcohol, and octyl alcohol. Preferred examples of the esters are dioctyl adipate, diisoheptyl adipate, dihexyl sebacate, diheptyl succinate, dioctyl phthalate, diisoheptyl phthalate, and diisoamyl phthalate.

Tri- or higher poly-carboxylates are also usable herein, for which polycarboxylic acids may be aliphatic polycarboxylic acids such as 1,2,3,4-butane-tetracarboxylic acid, or aromatic polycarboxylic acids such as trimellitic acid, and pyromellitic acid. The alcohol components for the esters may be of monoalcohols with a linear or branched C3–12 alkyl group, or polyalkylene glycol monoalcohols of a formula, H—(R'O)$_n$—R in which R' indicates a C2–8 alkylene group, R indicates a C1– 10 alkyl group, and n is an integer of from 1 to 10. Herein usable are polycarboxylates to be prepared by esterifying the polycarboxylic acids mentioned above with alcohols such as those also mentioned above, as well as complex esters to be prepared by reacting those polycarboxylic acids with those alcohols and further with other polyalcohols such as ethylene glycol or propylene glycol for esterification.

Alicyclic polycarboxylates are also usable herein, which may be represented by the following general formula (XVIII):

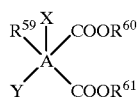

(XVIII)

wherein A represents a cyclohexane ring or a cyclohexene ring; $R^{59}$ represents a hydrogen atom or a methyl group; X represents a hydrogen atom or $COOR^{62}$; Y represents a hydrogen atom or $COOR^{63}$; and $R^{60}$ to $R^{63}$ each indicate a C3–18 alkyl group or a C3–10 cycloalkyl group, and they may be the same or different.

These esters may be prepared by esterifying a predetermined acid component with a predetermined alcohol component in any ordinary manner, but preferably in an inert gas atmosphere of nitrogen gas or the like, in the presence or absence of an esterification catalyst, and under heat with stirring the components.

The acid component includes cycloalkane-polycarboxylic acids, cycloalkene-polycarboxylic acids and their anhydrides. One or more of those compounds may be used either singly or as combined, for the acid component. Concretely mentioned are 1,2-cyclohexane-dicarboxylic acid, 4-cyclohexene-1,2-dicarboxylic acid, 1-cyclohexene-1,2-dicarboxylic acid, 1,3-cyclohexane-dicarboxylic acid, 1,4-cyclohexane-dicarboxylic acid, 3-methyl-1,2-cyclohexane-dicarboxylic acid, 4-methyl-1,2-cyclohexane-dicarboxylic acid, 3-methyl-4-cyclohexene-1,2-dicarboxylic acid, 4-methyl-4-cyclohexene-1,2-dicarboxylic acid, 1,2,4-cyclohexane-tricarboxylic acid, 1,3,5-cyclohexane-tricarboxylic acid, 1,2,4,5-cyclohexane-tetracarboxylic acid, and their anhydrides. Of those, preferred are 1,2-cyclohexane-dicarboxylic acid, 3-methyl-1,2-cyclohexane-dicarboxylic acid, 4-methyl-1,2-cyclohexane-dicarboxylic acid, 4-cyclohexene-1,2-dicarboxylic acid, 3-methyl-4-cyclohexene-1,2-dicarboxylic acid, 4-methyl-4-cyclohexene-1,2-dicarboxylic acid, and their anhydrides.

The alcohol component includes linear or branched aliphatic C3–18 alcohols, and alicyclic C3–10 alcohols. Specific examples of the linear aliphatic alcohols are n-propyl alcohol, n-butanol, n-pentanol, n-hexanol, n-heptanol, n-octanol, n-nonanol, n-decanol, n-undecanol, n-dodecanol, n-tetradecanol, n-hexadecanol, n-octadecanol, etc.

Specific examples of the branched aliphatic alcohols are isopropanol, isobutanol, sec-butanol, isopentanol, isohexanol, 2-methylhexanol, 2-methylheptanol, isoheptanol, 2 -ethylhexanol, 2-octanol, isooctanol, 3,5,5-trimethylhexanol, isodecanol, isoundexanol, isotridecanol, isotetradecanol, isohexadecanol, isooctadecanol, 2,6-dimethyl-4-heptanol, etc.

Specific examples of the alicyclic alcohols are cyclohexanol, methylcyclohexanol, dimethylcyclohexanol, etc.

Of those alicyclic polycarboxylates to be prepared from such polycarboxylic acids and alcohols, especially preferred are diisobutyl 1,2-cyclohexane-dicarboxylate, dicyclohexyl 1,2-cyclohexane-dicarboxylate, diisoheptyl 1,2-cyclohexane-dicarboxylate, di(2-ethylhexyl) 1,2-cyclohexae-dicarboxylate, di(3,5,5-trimethylhexyl) 1,2-cyclohexane-dicarboxylate, di(2,6-dimethyl-4-heptyl) 1,2-cyclohexane-dicarboxylate, diisodecyl 1,2-cyclohexane-dicarboxylate, diisoundecyl 1,2-cyclohexane-dicarboxylate, dicyclohexyl 4-cyclohexene-1,2-dicarboxylate, diisoheptyl 4-cyclohexene-1,2-dicarboxylate, di(2-ethylhexyl) 4-cyclohexene-1,2-dicarboxylate, di(3,5,5-trimethylhexyl) 4-cyclohexene-1,2-dicarboxylate, di(3,5,5-trimethylhexyl) 3-methyl-1,2-cyclohexane-dicarboxylate, di(3,5,5-trimethylhexyl) 4-methyl-1,2-cyclohexane-dicarboxylate, di(3,5,5-trimethylhexyl) 3-methyl-4-cyclohexene-1,2-dicarboxylate, di(3,5,5-trimethylhexyl) 4-methyl-4-cyclohexene-1,2-dicarboxylate, and tetra(3,5,5-trimethylhexyl) 1,2,4,5-cyclohexane-tetracarboxylate.

The alicyclic polycarboxylates may be mixed with any other esters (hereinafter these are referred to as additional esters), with which their physical balance including volume-specific resistivity and viscosity could be improved. The additional esters include adipates, azelates, sebacates, phthalates, trimellitates, and polyalcohol esters. The polyalcohol component for the polyalcohol esters includes neopentyl glycol, trimethylolpropane, pentaerythritol, dipentaerythritol, etc. The acid component for them includes isobutyric acid, 2-ethylbutyric acid, isovaleric acid, pivalic acid, cyclohexanecarboxylic acid, 2-methylpentanoic acid, 2-ethylpentanoic acid, 2-methylhexanoic acid, 2-ethylhexanoic acid, 3,5,5-trimethylhexanoic acid, etc.

Apart from ① and ② mentioned above, further employable herein are diesters to be prepared by esterifying monoalcohol-alkylene oxide adducts with aliphatic dicarboxylic acids such as adipic acid, pimelic acid, suberic acid, azelaic acid, sebacic acid, undecane-diacid, dodecane-diacid, or docosane-diacid, or with aromatic dicarboxylic acids such as phthalic acid. Still further employable are esters to be prepared by esterifying polyalcohol-alkylene oxide (1 to 10 mols) adducts in which the polyalcohol may be, for example, glycerin or trimethylolpropane, with C3–12 fatty acids such as propionic acid, butyric acid, valeric acid, hexanoic acid, heptanoic acid, octanoic acid, nonanoic acid, decanoic acid, dodecanoic acid, 2-methylhexanoic acid, 2-ethylhexanoic acid, isooctanoic acid, isononanoic acid, isodecanoic acid, 2,2-dimethyloctanoic acid, or 2-butyloctanoic acid.

③ Other Polyesters

Still other polyesters employable herein are fumarate oligomers and hydroxypivalates.

The fumarate oligomers may be homopolymers of fumarates or copolymers of fumarates with unsaturated aliphatic hydrocarbons, and may be represented by a general formula (XIX):

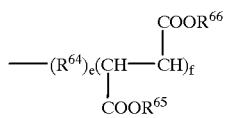 (XIX)

wherein $R^{64}$ represents an alkylene group, a substituted alkylene group, or an alkylene oxide group; $R^{65}$ and $R^{66}$ each represent a C1–9 alkyl group, an allyl group, or a terminal-substituted or unsubstituted polyalkylene oxide group, and these may be the same or different; e is 0 or an integer of at least one, f is an integer of at least one; and $R^{64}$ is not larger than 50 mol % of the oligomer.

Concretely mentioned are diethyl fumarate oligomers and dibutyl fumarate oligomers.

In formula (XIX), both terminals are of residues of the polymerization initiator used in polymerization to give the oligomers, and are not shown.

Also mentioned are alkyl fumarate copolymers comprising from 1 to 50 mol % of structural units of a formula (XX):

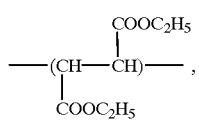 (XX)

and from 50 to 99 mol % of structural units of a general formula (XXI):

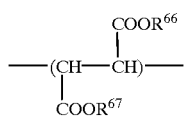 (XXI)

wherein $R^{67}$ and $R^{68}$ each represent a C3–8 alkyl group, and they may be the same or different.

The hydroxypivalates may be represented by a general formula (XXII):

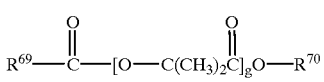 (XXII)

wherein $R^{69}$ and $R^{70}$ each represent a C2–10 alkyl group, and g is an integer of from 1 to 5.

(A-4) Carbonates

Carbonates for use herein include compounds of a general formula (XXIII):

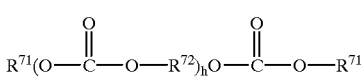 (XXIII)

wherein $R^{71}$ represents a C2–10 alkyl group; $R^{72}$ represents a C2–10 alkylene or cycloalkylene group; and h is an integer of from 1 to 4, and compounds of a general formula (XXIV):

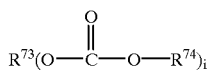 (XXIV)

wherein $R^{73}$ represents a hydroxyl group-having C2–6 polyalcohol residue; $R^{74}$ represents a C2–10 alkyl group; and i is an integer of from 2 to 6.

Those carbonates may be prepared by interesterifying dimethyl carbonate with alcohols in the presence of a basic catalyst.

Also usable herein are compounds of a general formula (XXV):

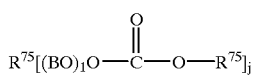 (XXV)

wherein $R^{75}$ represents a C1–10 alkyl group; $R^{76}$ represents a C2–10 alkyl group; j is an integer of from 2 to 10; 1 is an integer of from 2 to 100; and —BO— represents —CH$_2$—CH(CH$_3$)—O— or —CH$_2$—CH$_2$—O—.

The carbonates may be prepared, for example, by reacting carbonic acid with alkylene oxides. In those, the alkylene oxide moiety added to the carbonate moiety may be from a single ethylene oxide or a single propylene oxide or may also be from their mixture.

Of the oxygen-containing compounds of (A-1) to (A-4), especially preferred are those of (A-1) and (A-2).

The base oil for use in the invention may comprise one and the same type of or two or more different types of the oxygen-containing compounds of (A-1) to (A-4) either singly or as combined. For example, it may comprise one compound (A-1), or may comprise two or more of the same type of the compounds (A-1), or may even comprise two or more of different types of compounds (A-1) and (A-2), either singly or as combined.

The base oil shall comprise any of the compounds (A-1) to (A-4) as the essential component, but, if desired, it may optionally contain a minor amount of any other compounds of, for example, mineral oils, hydrocarbons such as poly-α-olefins, monoesters, etc.

The refrigerator oil of the invention may further contain a metal salt of a carboxylic acid. The metal carboxylate is preferably a metal salt of a carboxylic acid having from 3 to 60 carbon atoms, more preferably from 3 to 30 carbon atoms, even more preferably from 12 to 30 carbon atoms. It may also be a metal salt of a dimer or trimer acid of fatty acids such as those mentioned hereinabove, or a metal salt of a dicarboxylic acid having from 3 to 30 carbon atoms. Of those, especially preferred for use herein are metal salts of fatty acids having from 12 to 30 carbonatoms, andmetal salts of dicarboxylic acids having from 3 to 30 carbon atoms.

Preferably, the metal component for the metal salts is of alkali metals or alkaline earth metals. Most preferred are alkali metals.

Various types of carboxylic acids are employable for forming the metal carboxylates, including, for example, aliphatic saturated monocarboxylic acids, aliphatic unsaturated monocarboxylic acids, aliphatic dicarboxylic acids, aromatic carboxylic acids, etc.

More concretely, the aliphatic saturated monocarboxylic acids include, for example, linear saturated acids such as caproic acid, caprylic acid, capric acid, lauric acid, myristic acid, palmitic acid, stearic acid, arachic acid, cerotic acid, lacceric acid, etc.; and branched fatty acids such as isopentanoic acid, 2-methylpentanoic acid, 2-methylbutanoic acid, 2,2-dimethylbutanoic acid, 2-methylhexanoic acid, 5-methylhexanoic acid, 2,2-dimethylheptanoic acid, 2-ethyl-2-methylbutanoic acid, 2-ethylhexanoic acid, dimethylhexanoic acid, 2-n-propylpentanoic acid, 3,5,5-trimethylhexanoic acid, dimethyloctanoic acid, isotridecanoic acid, isomyristic acid, isostearic acid, isoarachic acid, isohexanoic acid, etc. The unsaturated carboxylic acids include, for example, palmitoleic acid, oleic acid, elaidic acid, linolic acid, linolenic acid, and also unsaturated hydroxy acids such as ricinoleic acid, etc. The aliphatic dicarboxylic acids include, for example, adipic acid, azelaic acid, sebacic acid, etc. The aromatic carboxylic acids include, for example, benzoic acid, phthalic acid, trimellitic acid, pyromellitic acid, etc. Also employable are alicyclic fatty acids such as naphthenic acid, etc. Two or more of those carboxylic acids may be used as combined.

The metal for the metal carboxylates is not specifically defined, and various types of metals are usable for them. For example, usable are alkali metals such as lithium, potassium, sodium, etc.; alkaline earth metals such as magnesium, calcium, strontium, etc.; and other metals such as zinc, nickel, aluminium, etc. Preferred are alkali metals and alkaline earth metals, and most preferred are alkali metals.

For the metal component for the metal carboxylates, the metal is not limited to only one for one carboxylic acid component, but one metal carboxylate may have two or more metals.

In the refrigerator oil of the invention, the amount of the metal carboxylate preferably fall between 0.001 and 5% by weight, more preferably between 0.005 and 3% by weight. If it is smaller than 0.001% by weight, the abrasion resistance of the refrigerator oil will be unsatisfactory; but if larger than 5% by weight, the stability of the refrigerator oil will be poor. Anyhow, overstepping the defined range is unfavorable.

For producing the refrigerator oil of the invention that contains such a metal carboxylate, the metal carboxylate may be added to the base oil for the refrigerator oil, for which various methods may be employable. In order to enhance the solubility of the metal carboxylate in the base oil, one preferred method is recommended for producing the intended refrigerator oil. The method is for previously dissolving or dispersing the metal carboxylate in a solvent. Precisely, the method comprises putting a carboxylic acid and an alkali hydroxide into a solvent, and reacting them at room temperature or under heat to thereby form a metal carboxylate dissolved or dispersed in the solvent. Next, the resulting solution or dispersion of the metal carboxylate in the solvent is directly added to, and mixed and dispersed in abase oil. In that manner, a metal carboxylate is previously dissolved or dissolved in a solvent, and thereafter the resulting solution or dispersion of the metal salt is efficiently formulated with a base oil into the intended refrigerator oil of the invention.

Various types of solvents are employable for that purpose. For example, employable are monoalcohols such as n-butyl alcohol, iso-butyl alcohol, sec-butyl alcohol, t-butyl alcohol, n-amyl alcohol, iso-amyl alcohol, sec-amyl alcohol, n-hexyl alcohol, methylamyl alcohol, ethylbutyl alcohol, heptyl alcohol, n-octyl alcohol, sec-octyl alcohol, 2-ethylhexyl alcohol, iso-octyl alcohol, n-nonyl alcohol, 2,6-dimethyl-4-heptanol, n-decyl alcohol, cyclohexanol, etc.; glycols and polyalcohols such as ethylene glycol, diethylene glycol, triethylene glycol, tetraethylene glycol, propylene glycol, dipropylene glycol, 1,4-butylene glycol, 2,3-butylene glycol, hexylene glycol, octylene glycol, glycerin, etc.; and cellosolves such as ethylene glycol monomethyl ether, ethylene glycol ethyl ether, ethylene glycol diethyl ether, ethylene glycol butyl ether, ethylene glycol dibutyl ether, ethylene glycol phenyl ether, ethylene glycol benzyl ether, ethylene glycol ethylhexyl ether, diethylene glycol ethyl ether, diethylene glycol diethyl ether, diethylene glycol butyl ether, diethylene glycol dibutyl ether, propylene glycol methyl ether, propylene glycol ethyl ether, propylene glycol butyl ether, dipropylene glycol methyl ether, dipropylene glycol ethyl ether, tripropylene glycol methyl ether, tetraethylene glycol dimethyl ether, tetraethylene glycol dibutyl ether, etc. Also employable are crown ethers such as benzo-15-crown-5, benzo-12-crown-4, benzo-18-crown-6, dibenzo-18-crown-6, etc.; ketones such as ethyl butyl ketone, dipropyl ketone, methyl amylketone, methyl hexyl ketone, diisobutyl ketone, etc.; as well as fatty acids such as those having from 3 to 30 carbon atoms as above.

The concentration of the metal salt to be dissolved or dispersed in the solvent is not specifically defined, and may be suitably determined depending on the ambient conditions.

The refrigerator oil for carbon dioxide refrigerant of the invention may optionally contain any other additives, in addition to the components noted above. For example, it may contain any known extreme pressure agent, acid scavenger, antioxidant and preservative.

The extreme pressure agent may be a sulfur-containing extreme pressure agent, including, for example, phosphates, acid phosphates, phosphites, acid phosphites, and their amine salts. The phosphates include, for example, triaryl phosphates, trialkyl phosphates, trialkylaryl phosphates, triarylalkyl phosphates, and trialkenyl phosphates. Their specific examples are triphenyl phosphate, tricresyl phosphate, benzyldiphenyl phosphate, ethyldiphenyl phosphate, tributyl phosphate, ethyldibutyl phosphate, cresyldiphenyl phosphate, dicresylphenyl phosphate, ethylphenyldiphenyl phosphate, diethylphenylphenyl phosphate, propylphenyldiphenyl phosphate, dipropylphenylphenyl phosphate, triethylphenyl phosphate, tripropylphenyl phosphate, butylphenyldiphenyl phosphate, dibutylphenylphenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Specific examples of the acid phosphates are 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, and isostearyl acid phosphate.

Specific examples of the phosphites are triethyl phosphite, tributyl phosphite, triphenyl phosphate, tricresyl phosphite, tri(nonylphenyl) phosphite, tri(2-ethylhexyl) phosphite, tridecyl phosphite, trilauryl phosphite, triisooctyl phosphite, diphenylisodecyl phosphite, tristearyl phosphite, trioleyl phosphite, and 2-ethylhexyldiphenyl phosphite.

Specific examples of the acid phosphites are dibutyl hydrogenphosphite, dilauryl hydrogenphosphite, dioleyl hydrogenphosphite, distearyl hydrogenphosphite, and diphenyl hydrogenphosphite.

Amines to form amine salts with the compounds mentioned above are, for example, mono-substituted amines, di-substituted amines and tri-substituted amines of a general formula (XXVI):

(XXVI)

wherein $R^{77}$ represents a C3–30 alkyl or alkenyl group, a C6–30 aryl or aralkyl group, or a C2–30 hydroxyalkyl group, and s is 1, 2 or 3; and plural $R^{77}$'s, if any, may be the same or different.

The C3–30 alkyl or alkenyl group for $R^{77}$ in formula (XXVI) may be linear, branched or cyclic.

Specific examples of the mono-substituted amines are butylamine, pentylamine, hexylamine, cyclohexylamine, octylamine, laurylamine, stearylamine, oleylamine, and benzylamine; and those of the di-substituted amines are dibutylamine, dipentylamine, dihexylamine, dicyclohexylamine, dioctylamine, dilaurylamine, distearylamine, dioleylamine, dibenzylamine, stearylmonoethanolamine, decylmonoethanolamine, hexylmonoethanolamine, benzylmonoethanolamine, phenylmonoethanolamine, and tolylmonopropanolamine. Specific examples of the tri-substituted amines are tributylamine, tripentylamine, trihexylamine, tricyclohexylamine, trioctylamine, trilaurylamine, tristearylamine, trioleylamine, tribenzylamine, dioleylmonoethanolamine, dilaurylmonopropanolamine, dioctylmonoethanolamine, dihexylmonopropanolamine, dibutylmonopropanolamine, oleyldiethanolamine, stearyldipropanolamine, lauryldiethanolamine, octyldipropanolamine, butyldiethanolamine, benzyldiethanolamine, phenyldiethanolamine, tolyldipropanolamine, xylyldiethanolamine, triethanolamine, and tripropanolamine.

Of those phosphorus-containing extreme pressure agents, preferred are tricresyl phosphate, tri (nonylphenyl) phosphite, dioleyl hydrogenphosphite, and 2-ethylhexyldiphenyl phosphite, as having good extreme pressure-improving capabilities and good friction-reducing capabilities.

Apart from the extreme pressure agents noted above, further employable herein are sulfur-containing extreme pressure agents, which include, for example, sulfidized oils and fats, sulfidized fatty acids, ester sulfides, olefin sulfides, dihydrocarbyl polysulfides, thiocarbamates, thioterpenes, and dialkylthio dipropionates. The sulfidized oils and fats may be prepared by reacting sulfur or a sulfur-containing compound with oils and fats (lard oil, whale oil, vegetable oil, fish oil, etc.) Their sulfur content is not specifically defined, but preferably falls between 5 and 30% by weight. Specific examples of the sulfidized oils and fats are sulfidized lard, sulfidized rapeseed oil, sulfidized castor oil, sulfidized soybean oil, and sulfidized rice bran oil. One example of the sulfidized fatty acids is oleic acid sulfide. Examples of the ester sulfides are methyl oleate sulfide, and sulfidized octyl esters of rice bran fatty acids.

As the olefin sulfides, for example, mentioned are compounds of a general formula (XVIII):

$$R^{56}-S_t-R^{57} \qquad \text{(XVIII)}$$

wherein $R^{56}$ represents a C2–15 alkenyl group; $R^{57}$ represents a C2–15 alkyl or alkenyl group; and t is an integer of from 1 to 8.

The compounds may be prepared by reacting a C2–15 olefin or its dimer, trimer or tetramer with a sulfidizing agent such as sulfur or sulfur chloride. As the olefin, preferred are propylene, isobutene and diisobutene.

The dihydrocarbyl polysulfides are compounds of a general formula (XIX):

$$R^{58}-S_u-R^{59} \qquad \text{(XIX)}$$

wherein $R^{58}$ and $R^{59}$ each represent a C1–20 alkyl or cycloalkyl group, a C6–20 aryl group, a C7–20 alkylaryl group, or a C7–20 arylalkyl group, and these may be the same or different; and u is an integer of from 2 to 8.

Of the compounds, those where $R^{58}$ and $R^{59}$ are both alkyl groups are referred to as alkyl sulfides.

In formula (XIX), specific examples of $R^{58}$ and $R^{59}$ are a methyl group, an ethyl group, an n-propyl group, an isopropyl group, an n-butyl group, an isobutyl group, a sec-butyl group, a tert-butyl group, all types of pentyl groups, all types of hexyl groups, all types of heptyl groups, all types of octyl groups, all types of nonyl groups, all types of decyl groups, all types of dodecyl groups, a cyclohexyl group, a cyclooctyl group, a phenyl group, a naphthyl group, a tolyl group, a xylyl group, a benzyl group, and a phenethyl group.

Preferred examples of the dihydrocarbyl polysulfides are dibenzyl polysulfide, di-tert-nonyl polysulfide, didodecyl polysulfide, di-tert-butyl polysulfide, dioctyl polysulfide, diphenyl polysulfide, and dicyclohexyl polysulfide.

One example of the thiocarbamates is zinc dithiocarbamate; examples of the thioterpenes are reaction products of phosphorus pentasulfide with pinene; and examples of the dialkylthio dipropionates are dilaurylthio dipropionate and distearylthio dipropionate.

Further employable herein are carboxylic acid-based extreme pressure agents, such as metal carboxylates.

For the metal carboxylates, referred to are those mentioned hereinabove. For their amount to be in the refrigerator oil, and for the method of adding them to the oil, also referred to are those mentioned hereinabove.

The refrigerator oil of the invention may contain one or more of the extreme pressure agents noted above, either singly or as combined. The extreme pressure agent content of the refrigerator oil preferably falls between 0.005 and 5% by weight relative to the base oil to be in the refrigerator oil. If the content is smaller than 0.005% by weight, the refrigerator oil could not have good pressure resistance and friction resistance. On the other hand, if the content is larger than 5% by weight, the oil will form much sludge.

Containing the phosphorus-containing extreme pressure agent as above, the refrigerator oil could exhibit much improved lubricity even in a supercritical carbon dioxide atmosphere.

The acid scavenger that may be optionally in the refrigerator oil of the invention includes, for example, epoxy compounds such as phenyl glycidyl ethers, alkyl glycidyl ethers, alkylene glycol glycidyl ethers, cyclohexene oxides, α-olefin oxides, and epoxidated soybean oils. Of those, preferred are phenyl glycidyl ethers, alkyl glycidyl ethers, alkylene glycol glycidyl ethers, cyclohexene oxides and α-olefin oxides, in view of their compatibility with base oil.

The refrigerator oil may contain one or more of those acid scavengers either singly or as combined. The acid scavenger content of the refrigerator oil preferably falls between 0.005 and 5% by weight relative to the base oil. If the content is smaller than 0.005% by weight, the acid scavenger could not exhibit its acid-scavenging capabilities. On the other hand, if the content is larger than 5% by weight, the acid scavenger will cause sludge formation in the refrigerator oil. Containing both the extreme pressure agent and the acid scavenger, the refrigerator oil could keep better stability and could exhibit better lubricity even when exposed to a supercritical carbon dioxide atmosphere. In the refrigerator oil containing both the two, the total amount of the two desirably falls between 0.005 and 5% by weight relative to the base oil.

The antioxidant includes, for example, phenolic antioxidants such as 2,6-di-tert-butyl-4-methylphenol, 2,6-di-tert-butyl-4-ethylphenol, and 2,2'-methylenebis(4-methyl-6-tert-butylphenol); and amine-type antioxidants such as phenyl-α-naphthylamine, phenyl-β-naphthylamine, and N,N'-diphenyl-p-phenylenediamine. Especially preferred are phenolic antioxidants. The refrigerator oil may contain such an antioxidant in an amount of from 0.01 to 5% by weight, preferably from 0.05 to 3% by weight. If its content is smaller than 0.01% by weight, the antioxidant could not satisfactorily exhibit its effect. However, even if its content is larger than 5% by weight, the effect of the antioxidant will not be enhanced any more. Containing the acid scavenger and the extreme pressure agent along with the antioxidant, the refrigerator oil could have much more enhanced stability even when exposed to a supercritical carbon dioxide atmosphere.

The base oil constituting the refrigerator oil of the invention may optionally contain still other known additives of, for example, copper inactivators such as benzotriazole and its derivatives, e.g., N-[N,N'-di(3–12C)alkyl-aminomethyl] tolutriazoles, and defoaming agents such as silicone oil and fluorosilicone oil, so far as the additives do not interfere with the object of the invention. The amount of the additives to be in the base oil may fall between 0.5 and 10% by weight.

The carbon dioxide refrigerant as referred to herein indicates any and every one comprising carbon dioxide as the essential component, and it may contain any additional refrigerant components of, for example, hydrocarbons such as propane or isobutane; ammonia; Flons such as hydrofluorocarbons and fluorocarbons, typically 1,1,1,2-tetrafluoroethane (R-134a). Even though the refrigerant contains any such additional components but so far as it comprises carbon dioxide as the essential component, the refrigerator oil is effective thereto and produces good results when applied thereto.

In the method of using the refrigerator oil of the invention for lubricating refrigerators, it is desirable that the ratio of the carbon dioxide-based refrigerant to be combined with the refrigerator oil to the refrigerator oil, refrigerant/refrigerator oil, falls between 99/1 and 10/90 by weight. If the amount of the refrigerant is smaller than the defined range, the refrigerating capabilities of the refrigerator oil combined with the refrigerant will be poor. If, on the other hand, the amount of the refrigerant is larger than that range, the lubricating capabilities of the refrigerator oil will be poor. Anyhow, the amount of the refrigerant over stepping the defined range is unfavorable. For these reasons, the ratio by weight of refrigerant/refrigerator oil is more preferably from 95/5 to 30/70.

Figure 2:
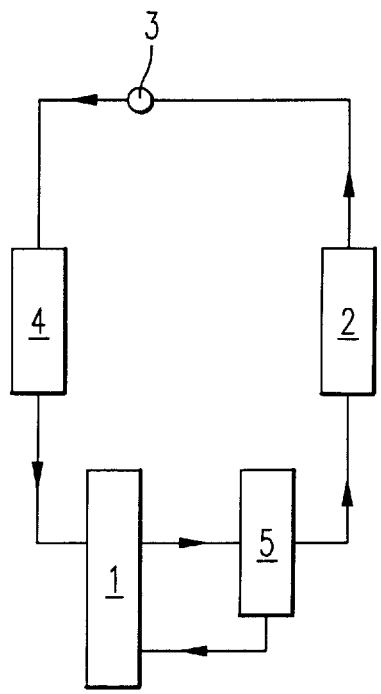
FIG. 2 is a flowchart showing one embodiment of a compression refrigeration cycle of "compressor-condenser-expansion valve-evaporator", which is equipped with an oil separator.
Figure 3:
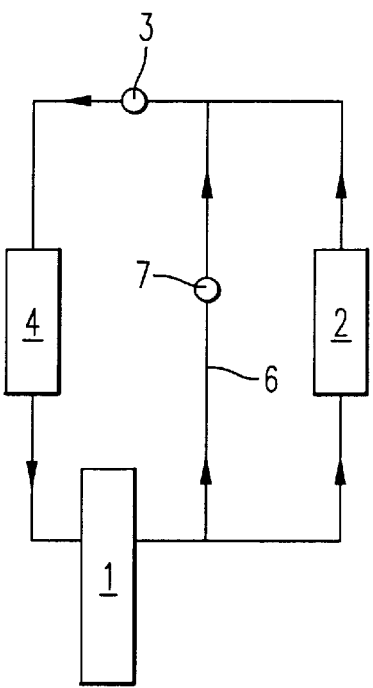
FIG. 3 is a flowchart showing one embodiment of a compression refrigeration cycle of "compressor-condenser-expansion valve-evaporator", which is equipped with a hot gas line.
Figure 4:
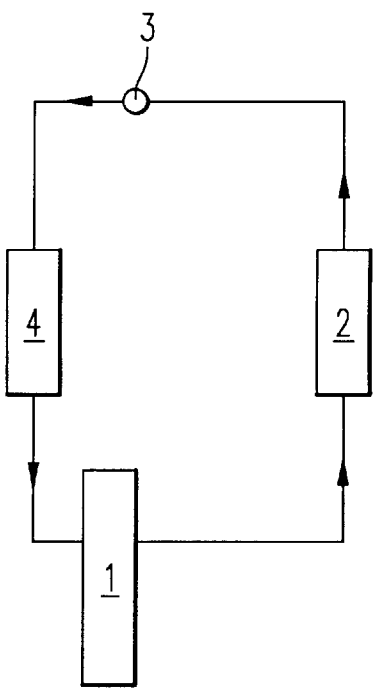
FIG. 4 is a flowchart showing one embodiment of a compression refrigeration cycle of "compressor-condenser-expansion valve-evaporator".

The refrigerator oil of the invention is applicable to various types of refrigerators, and is especially suitable to the compression refrigeration cycle for compression refrigerators. In particular, the refrigerator oil of the invention exhibits its effects more effectively, when applied to compression refrigeration cycles equipped with an oil separator and/or a hot gas line, such as those illustrated in FIGS. 1 to 3 attached hereto. As a rule, a compression refrigeration cycle comprises compressor-condenser-expansion valve-evaporator. The lubricating oil for refrigerators generally has good compatibility with the refrigerant for them. However, when a carbon dioxide-based refrigerant is used in the refrigeration cycle as above and when the refrigerator is lubricated with ordinary refrigerator oil, the ability of the oil to prevent machine parts from being worn away will be often poor and the stability of the oil will be also poor. As a result, it is often impossible to use the refrigerator oil for a long period of time. In particular, this tendency is noticeable when the refrigerator oil is used in refrigeration cycles for electric refrigerators or small-sized air conditioners in which a capillary tube is used as the expansion valve. In that situation, the refrigerator oil of the invention is still effective even in driving a compression refrigeration cycle equipped with an oil separator and/or a hot gas line, for which is used a carbon dioxide-based refrigerant

EXAMPLES

The invention is described in more detail with reference to the following Examples, which, however, are not intended to restrict the scope of the invention.

The properties and the capabilities of the refrigerator oil samples produced in Examples were determined according to the following methods.

Stability Test 40 g of an oil sample, 40 g of carbon dioxide refrigerant, and a metal catalyst of copper, aluminium and iron were put into a 120 ml autoclave, to which was added water to make the system have a water content of 2000 ppm. The autoclave was sealed, and kept at 175° C. for 10 days. After thus left, the oil sample was analyzed. During the experiment, the inner pressure was kept at 16 MPa.

Abrasion Test

Used herein was a closed Falex abrasion tester with a pin/block combination of steel pin (SUJ-2) and aluminium block (A4032). In the tester, the amount (mg) of the abraded block in a carbon dioxide refrigerator gas atmosphere was measured. Regarding the test condition, the amount of the oil sample used was 300 ml; the carbon dioxide gas pressure at an oil temperature of 50° C. was 2 MPa; the revolution number was 2000 rpm; the load was 350 lbs; and the test time was 60 minutes.

Critical Solution Temperature 0.2 g of an oil sample and 1.8 g of liquefied carbon dioxide were put into a pressure glass tube, which was then sealed. The sealed tube was cooled to –60° C., at which the two in the tube were dissolved. Next, the tube was heated at a predetermined constant heating rate, whereupon the solution in the tube was separated into two layers through phase separation. The temperature at which the solution was separated into two layers was read, and it indicates the critical solution temperature for the carbon dioxide refrigerant of the oil sample tested.

Base oils used in Examples and Comparative Examples are mentioned below.

Base Oils

For the samples of Examples and Comparative Examples, used were base oils shown in Table 1 (for Examples 1 to 10, and Comparative Examples 1 to 4), and those in Table 4 (for Examples 11 to 14, and Comparative Examples 5 and 6). These base oils contained 1.5% by weight of an α-olefin oxide and 0.5% by weight of 2,6-di-tert-butyl-4-methylphenol.

The phosphorus-containing extreme pressure agents in Tables 2 and 5 are as follows:

TCP: Tricresyl phosphate
TNP: Trisnonylphenyl phosphite
DOHP: Dioleyl hydrogenphosphite Preparation of Metal Salts of Carboxylic Acids As a solvent, used was dipropylene glycol. The carboxylic acid used was oleic acid, palmitic acid or sebacic acid; and the alkali hydroxide used was potassium hydroxide or sodium hydroxide. The carboxylic acid and the alkali hydroxide were reacted in the solvent to prepare a solution of 30% by weight of potassium oleate, sodium oleate, sodium palmitate or potassium sebacate.

Examples 1 to 10
Comparative Examples 1 to 4

Refrigerator oils shown in Table 2 were tested for the stability and the abrasion resistance. The test results are shown in Table 3.

Examples 11 to 14
Comparative Examples 5 and 6

Refrigerator oils shown in Table 5 were tested for the critical solution temperature, the stability and the abrasion resistance. (In Table 5, the amount of the extreme pressure agent is based on the composition containing it.) The test results are shown in Table 6.

TABLE 1

| | Base oil | Kinematic Viscosity at 100° C. (mm$^2$/sec) | Viscosity Index |
|---|---|---|---|
| PAG-1 | polyoxypropylene glycol dimethyl ether | 10.9 | 220 |
| PAG-2 | polyoxypropylene glycol dimethyl ether | 19.2 | 210 |
| PAG-3 | polyoxyethylene-oxypropylene glycol dimethyl ether [EO/PO = 2/8, by mol] | 9.9 | 215 |
| PAG-4 | polyoxyethylene-oxypropylene glycol dimethyl ether [EO/PO = 3/7, by mol] | 19.8 | 215 |
| PAG-5 | polyoxypropylene glycol monomethyl ether | 9.7 | 178 |
| PAG-6 | polyoxyethylene-oxypropylene glycol mono-n-butyl ether [EO/PO = 1/9, by mol] | 10.1 | 165 |
| PVE-1 | polyethyl vinyl ether/polyisobutyl vinyl ether [9/1, by mol] copolymer | 9.8 | 85 |
| PVE-2 | polyethyl vinyl ether/polyisobutyl vinyl ether [7/3, by mol] copolymer | 8.1 | 85 |
| POE-1 | pentaerythritol/2-ethylhexanoic acid (0.2 mols) + 3,5,5-trimethylhexanoic acid (0.8 mols) | 10.4 | 93 |

TABLE 2

| | Composition | | |
|---|---|---|---|
| | Base Oil | Metal Carboxylate (wt. %) | Phosphorus-containing Extreme Pressure Agent (wt. %) |
| Example 1 | PAG-1 | potassium oleate (1.0) | TNP (0.4) + TCP (0.8) |
| Example 2 | PAG-1 | sodium palmitate (0.5) | TNP (1.0) |
| Example 3 | PAG-2 | potassium oleate (0.5) | TCP (1.0) |
| Example 4 | PAG-3 | potassium oleate (1.0) | TCP (1.0) |
| Example 5 | PAG-4 | potassium sebacate (0.5) | DOHP (1.0) |
| Example 6 | PAG-4 | potassium oleate (0.8) | TNP (1.0) |
| Example 7 | PAG-5 | potassium oleate (1.0) | TNP (0.4) + TCP (0.8) |
| Example 8 | PAG-6 | potassium oleate (1.0) | TCP (1.0) |
| Example 9 | PVE-1 | potassium oleate (1.0) | TCP (1.0) |
| Example 10 | PVE-2 | potassium oleate (0.5) | TNP (1.0) |
| Comparative Example 1 | PAG-1 | chloroparaffin (1.5) | — |
| Comparative Example 2 | PAG-1 | — | TCP (1.0) |
| Comparative Example 3 | PVE-1 | — | TCP (1.0) |
| Comparative Example 4 | POE-1 | — | TCP (1.0) |

TABLE 3

| | Stability Test | | | | Abrasion Test |
|---|---|---|---|---|---|
| | Appearance of Oil | Precipitate | Metal Catalyst | Total Acid Value (mgKOH/g) | Amount Abraded (mg) |
| Example 1 | good | no | not changed | 0.08 | 3.1 |
| Example 2 | good | no | not changed | 0.07 | 3.4 |
| Example 3 | good | no | not changed | 0.06 | 1.9 |
| Example 4 | good | no | not changed | 0.06 | 2.2 |
| Example 5 | good | no | not changed | 0.07 | 2.0 |
| Example 6 | good | no | not changed | 0.09 | 1.9 |
| Example 7 | good | no | not changed | 0.10 | 8.2 |
| Example 8 | good | no | not changed | 0.10 | 8.3 |
| Example 9 | good | no | not changed | 0.08 | 3.7 |
| Example 10 | good | no | not changed | 0.08 | 4.3 |
| Comparative Example 1 | brown | yes | discolored (iron, copper) | 1.06 | 78.0 |

TABLE 3-continued

| | Stability Test | | | | Abrasion Test |
|---|---|---|---|---|---|
| | Appearance of Oil | Precipitate | Metal Catalyst | Total Acid Value (mgKOH/g) | Amount Abraded (mg) |
| Comparative Example 2 | good | no | not changed | 0.03 | 28.0 |
| Comparative Example 3 | good | no | not changed | 0.02 | 35.0 |
| Comparative Example 4 | pale yellow | no | discolored (copper) | 0.10 | 257.0 |

TABLE 4

| | Compound Added to Base Oil | Kinematic Viscosity at 100° C. (mm$^2$/sec) | Viscosity Index |
|---|---|---|---|
| PAG-1 | polyoxypropylene glycol dimethyl ether | 10.9 | 217 |
| PAG-2 | polyoxyethylene-oxypropylene glycol dimethyl ether [EO/PO = 2/8, by mol] | 9.9 | 218 |
| PVE | polyethyl vinyl ether/polyisobutyl vinyl ether [9/1, by mol] copolymer | 8.1 | 85 |

TABLE 5

| | | Extreme Pressure Agent | |
|---|---|---|---|
| | Base Oil (ratio by weight) | Metal Carboxylate (wt. %) | Phosphorus-containing Extreme Pressure Agent (wt. %) |
| Example 11 | PAG-1 (95) + PVE (5) | potassium oleate (1.0) | TCP (1.0) |
| Example 12 | PAG-1 (90) + PVE (10) | potassium oleate (0.5) | TNP (1.0) |
| Example 13 | PAG-1 (70) + PVE (30) | potassium oleate (0.5) | TCP (1.0) |
| Example 14 | PAG-2 (80) + PVE (20) | potassium oleate (1.0) | TCP (1.0) |
| Comparative Example 5 | PAG-1 (100) | potassium oleate (0.5) | DOHP (1.0) |
| Comparative Example 6 | PAG-2 (100) | potassium oleate (0.5) | TNP (1.0) |

TABLE 6

| | Critical Solution Temperature (° C.) | Viscosity Index | Stability Test | | | Abrasion Test Amount Abraded (mg) |
|---|---|---|---|---|---|---|
| | | | Appearance of Oil | Precipitate | Metal Catalyst | |
| Example 11 | −42 | 202 | good | no | not changed | 3.3 |
| Example 12 | −39 | 198 | good | no | not changed | 3.2 |
| Example 13 | −15 | 179 | good | no | not changed | 2.8 |
| Example 14 | −21 | 186 | good | no | not changed | 2.2 |
| Comparative Example 5 | separated | 217 | good | no | not changed | 3.2 |
| Comparative Example 6 | separated | 218 | good | no | not changed | 3.0 |

The refrigerator oil of the invention comprises a base oil comprising an oxygen-containing organic compound as the essential component and having a kinematic viscosity at 100° C. of from 5 to 50 mm$^2$/sec and a viscosity index of at least 60, and optionally contains some additives. This can be used in compression refrigerators with carbon dioxide refrigerant therein, especially in refrigerating or heating-cooling equipment such as car air conditioners, refrigerators, freezers, air conditioners, heat pumps, compression refrigeration cycles equipped with oil separator and/or hot gas line, etc. This is stable and has excellent lubricity (abrasion resistance) even in a supercritical carbon dioxide atmosphere. In particular, when containing a metal carboxylate and a phosphorus-containing extreme pressure agent, the refrigerator oil for carbon dioxide refrigerant has better stability and lubricity in a supercritical carbon dioxide atmosphere, and can be used for a long period of time even in the atmosphere.

What is claimed is:

1. A refrigerator oil for carbon dioxide refrigerant, which comprises:
   (A) a base oil comprising an oxygen-containing organic compound and having a kinematic viscosity at 100° C. of from 5 to 50 mm²/sec and a viscosity index of at least 60; and
   (B) a metal salt of a carboxylic acid.

2. The refrigerator oil as claimed in claim 1, wherein the metal salt of a carboxylic acid is an alkali metal salt of a carboxylic acid having from 3 to 60 carbon atoms.

3. The refrigerator oil as claimed in claim 1, wherein the oxygen-containing organic compound is at least one selected from polyoxyalkylene glycols, polyvinyl ethers, polyesters and carbonates.

4. The refrigerator oil as claimed in claim 1, wherein the oxygen-containing organic compound is a compound of a general formula (I) or a compound comprising structural units of a general formula (V):

$$R^1-[(OR^2)_m-OR^3]_n \qquad (I)$$

where $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents an integer of from 1 to 6; and m represents a number to give a mean value of m×x falling between 6 and 80;

(V)

where $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number of from 0 to 10 on average; $R^{16}$ to $R^{20}$ may be the same or different in different structural units; and plural $R^{19}O$'s, if any, may be the same or different.

5. The refrigerator oil as claimed in claim 1, wherein the oxygen-containing organic compound is ① a polyalcohol ester, or ② a polycarboxylate.

6. The refrigerator oil as claimed in claim 1, which further contains a phosphorus-containing extreme pressure agent.

7. The refrigerator oil as claimed in claim 1, which further contains an acid scavenger.

8. The refrigerator oil as claimed in claim 1, which further contains a phenolic antioxidant.

9. A refrigerator oil for carbon dioxide refrigerant, which comprises:
   a base oil comprising a mixture of a polyoxyalkylene glycol and a polyvinyl ether;
   wherein said base oil has a kinematic viscosity at 100° C. of from 5 to 50 mm²/sec and a viscosity index of at least 60.

10. The refrigerator oil as claimed in claim 9, wherein the ratio of the polyoxyalkylene glycol to the polyvinyl ether falls between 40/60 and 99.9/0.1 by weight.

11. The refrigerator oil as claimed in claim 10, wherein the polyoxyalkylene glycol is a compound of a general formula (I):

$$R^1-[(OR^2)_m-OR^3]_n \qquad (I)$$

where $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1to 10 carbon atoms, or an acyl group having from 2 to 10 carbon atom; n represents an integer of from 1 to 6; and m represents a number to give a mean value of m×x falling between 6 and 80.

12. The refrigerator oil as claimed in claim 10, wherein the polyvinyl ether is a compound comprising structural units of a general formula (V):

(V)

where $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number of from 0 to 10 on average; $R^{16}$ to $R^{20}$ may be the same or different in different structural units; and plural $R^{19}O$'s, if any, may be the same or different.

13. The refrigerator oil as claimed in claim 10, which further contains an acid scavenger.

14. The refrigerator oil as claimed in claim 10, which further contains an extreme pressure agent.

15. The refrigerator oil as claimed in claim 14, wherein the extreme pressure agent is at least one selected from metal salts of carboxylic acids and phosphorus-containing extreme pressure agents.

16. A method of lubricating a compression refrigeration cycle equipped with at least one selected from the group consisting of oil separators and hot gas lines, comprising using the refrigerator oil of claim 1 as a lubricant.

17. The refrigerator oil of claim 9, further comprising a metal salt of a carboxylic acid.

18. The refrigerator oil as claimed in claim 17, wherein said metal salt of a carboxylic acid is an alkali metal salt of a carboxylic acid having from 3 to 60 carbon atoms.

19. A method of lubricating a compression refrigeration cycle equipped with at least one selected from the group consisting of oil separators and hot gas lines, comprising using the refrigerator oil of claim 9 as a lubricant.

* * * * *